(12) United States Patent
Losalka et al.

(10) Patent No.: US 10,984,198 B2
(45) Date of Patent: Apr. 20, 2021

(54) AUTOMATED TESTING OF DIALOG SYSTEMS

(71) Applicant: International Business Machines Corporation, Armonk, NY (US)

(72) Inventors: Arpan Losalka, Bangalore (IN); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 16/117,631

(22) Filed: Aug. 30, 2018

(65) Prior Publication Data

US 2020/0073938 A1  Mar. 5, 2020

(51) Int. Cl.
| | | |
|---|---|---|
| *G06F 40/00* | (2020.01) | |
| *G06F 40/30* | (2020.01) | |
| *G06N 7/00* | (2006.01) | |
| *G06F 40/247* | (2020.01) | |
| *G06F 40/295* | (2020.01) | |
| *G06N 3/00* | (2006.01) | |
| *G10L 15/18* | (2013.01) | |

(52) U.S. Cl.
CPC ............ *G06F 40/30* (2020.01); *G06F 40/247* (2020.01); *G06F 40/295* (2020.01); *G06N 7/005* (2013.01); *G06N 3/006* (2013.01); *G10L 15/1822* (2013.01)

(58) Field of Classification Search
CPC combination set(s) only.
See application file for complete search history.

(56) References Cited

U.S. PATENT DOCUMENTS

2013/0289984 A1* 10/2013 Hakkani-Tur ........ G06F 16/215
704/235
2018/0075368 A1 3/2018 Brennan et al.
(Continued)

OTHER PUBLICATIONS

Kim, B., Interactive and Interpretable Machine Learning Models for Human Machine Collaboration. Department of Aeronautics and Astronautics, Massachusetts Institute of Technology, Jun. 2015.
(Continued)

*Primary Examiner* — Vu B Hang
(74) *Attorney, Agent, or Firm* — Ryan, Mason & Lewis, LLP (57) ABSTRACT

Methods, systems and computer program products for automated testing of dialog systems are provided herein. A computer-implemented method includes receiving selection of a conversation workspace of the automated dialog system and identifying test case inputs to the automated dialog system, the test case inputs comprising example user input for the given conversation workspace that has portions thereof modified and which the automated dialog system maps to a different intent and/or a different entity relative to the example user input. The method further includes generating human-interpretable explanations of mappings of portions of the test case inputs to the different intent and/or entity, generating suggestions for modifying intents, entities and dialog flows of the given conversation workspace such that the test case inputs map to the same intent and/or the same entity as their corresponding example user input, and outputting the suggestions and the human-interpretable explanations to a user.

16 Claims, 7 Drawing Sheets

(56) References Cited

U.S. PATENT DOCUMENTS

2018/0089572 A1* 3/2018 Aili ..................... G06F 40/30
2018/0121062 A1* 5/2018 Beaver ............... G06F 3/04842

OTHER PUBLICATIONS

Liang et al., Deep Text Classification Can be Fooled, Apr. 26, 2017.
Samanta et al., Towards Crafting Text Adversarial Samples, Jul. 10, 2017.
Zhao et al., Generating Natural Adversarial Examples, International Conference on Learning Representations (ICLR), Feb. 23, 2018.

* cited by examiner

AUTOMATED TESTING OF DIALOG SYSTEMS

FIELD

The present invention relates to information technology and, more particularly, to language processing techniques.

BACKGROUND

Automated dialog systems, also referred to herein as conversation systems, are used in a wide variety of application areas. For example, automated dialog systems may be used to create various conversation workspaces having different dialog flows for implementing chatbots for customer support, user interaction, etc. As used herein, "chatbot(s)," "conversation system(s)," and "dialog system(s)" are used synonymously. More specifically, a chatbot is a computer program or other software which is capable of carrying out conversational communications via auditory and/or textual processes. Additionally, by way of illustration, a conversation workspace includes the underlying training data on which a chatbot is trained, and the conversation workspace includes intents, entities, dialog flows, etc. Each intent can represent a class of user utterances, and each dialog node can represent a state in the finite state machine (e.g., chatbot). Based on the user utterance received and the current dialog node, the system decides whether to move to a next and/or new dialog node.

SUMMARY

Embodiments of the invention provide techniques for automated testing of dialog systems, such as by hardening conversation workspaces of an automated dialog system against adversarial input that results in misclassification.

In one embodiment, an exemplary computer-implemented method comprises steps of receiving selection of a given conversation workspace of an automated dialog system, the given conversation workspace comprising one or more dialog flows, one or more entities and one or more intents, identifying one or more test case inputs to the automated dialog system, the one or more test case inputs comprising example user input selected from training data for the given conversation workspace that has one or more portions thereof modified and which the automated dialog system maps to at least one of a different intent and a different entity in the given conversation workspace relative to the example user input, generating one or more human-interpretable explanations of mappings of one or more portions of the one or more test case inputs to said at least one of the different intent and the different entity, generating one or more suggestions for modifying one or more of the intents, entities and dialog flows of the given conversation workspace such that at least one of the one or more test case inputs map to at least one of the same intent and the same entity as its corresponding example user input, and outputting the one or more suggestions and the human-interpretable explanations to at least one user. The steps are carried out by at least one computing device.

In another embodiment, an exemplary computer-implemented method comprises steps of selecting a first intent and an example user input that the automated dialog system classifies as mapping to the first intent and at least a first entity in the given conversation workspace, generating a first human-interpretable explanation of a mapping of one or more portions of the example user input to at least one of the first intent and the first entity, generating at least one test case input by modifying at least one of the one or more portions of the example user input, utilizing the automated dialog system to classify the test case input, responsive to the automated dialog system classifying the test case input as mapping to at least one of a second intent and a second entity in the given conversation workspace, generating a second human-interpretable explanation of a mapping of one or more portions of the test case input to at least one of the second intent and the second entity, generating one or more suggestions for modifying one or more of the intents, entities and dialog flows of the given conversation workspace such that the test case input maps to at least one of the first intent and the first entity, and outputting the one or more suggestions, the first human-interpretable explanation and the second human-interpretable explanation to at least one user. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for training automated dialog systems.

However, it is to be understood that embodiments of the invention are not limited to the illustrative methods, systems and devices but instead are more broadly applicable to other suitable methods, systems and devices.

Figure 1:
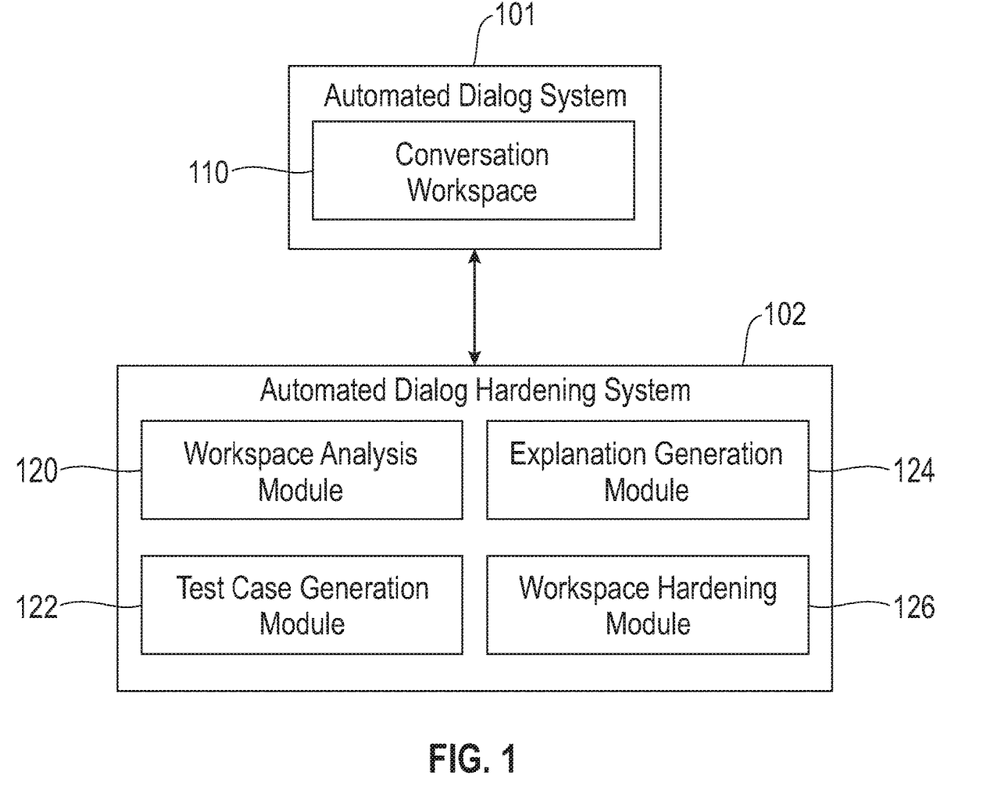
FIG. 1 depicts an automated dialog hardening system, according to an exemplary embodiment of the present invention.

FIG. 1 shows an automated dialog system 101, also referred to herein as a conversation system 101, which includes a conversation workspace 110. The conversation system 101 is built on the conversation workspace 110. Each conversation workspace 110 may include a number of dialog flows. Dialog flows are defined based on condition nodes, which may be arranged in a tree structure. If a condition match is found, the corresponding dialog flow is executed. A condition node may signify an intent or further details, such as the presence of specific entities.

Intents are categories in a conversation workspace 110 that define a user's purpose (e.g., ordering food, turning on or off a device, etc.). Typically, a few examples are provided corresponding to each intent. Entities are significant parts of an input that are used to alter the way the conversation system 101 responds to user input (e.g., an entity may be a location such as a city, a date or time, a point of interest or location, a particular product or service, etc.). Each entity contains certain values, and can optionally contain synonyms for such values.

FIG. 1 also shows an automated dialog hardening system 102 coupled to the automated dialog system 101. The automated dialog hardening system 102 may be used in some embodiments to automatically generate a user-explainable test case for conversation workspace 110 in the automated dialog system 101 and to provide for training or retraining of the automated dialog system 101 to handle adverse test cases to improve performance of the automated dialog system 101.

In the FIG. 1 embodiment, the automated dialog hardening system 102 includes a workspace analysis module 120, a test case generation module 122, an explanation generation module 124, and a workspace hardening module 126. The workspace analysis module 120 is configured to receive selection of the conversation workspace 110 of the automated dialog system 101. The test case generation module 122 is configured to identify one or more test case inputs to the automated dialog system 101, where the one or more test case inputs comprise example user input selected from training data for the given conversation workspace that has one or more portions thereof modified and which the automated dialog system 101 maps to at least one of a different intent and a different entity in the given conversation workspace relative to the example user input. The explanation generation module 124 is configured to generate one or more human-interpretable explanations of mappings of one or more portions of the one or more test case inputs to at least one of the different intent and the different entity.

The workspace hardening module 126 is configured to generate one or more suggestions for modifying one or more of the intents, entities and dialog flows of the given conversation workspace such that at least one of the one or more test case inputs maps to at least one of the same intent and the same entity as its corresponding example user input. The workspace hardening module 126 is further configured to output the one or more suggestions and the human-interpretable explanations to at least one user (e.g., an operator or designer of the given conversation workspace or the automated dialog system 101), and to receive selection by the user of one or more of the suggestions to implement. The workspace hardening module 126 then modifies the given conversation workspace in accordance with the selected or accepted suggestions.

The IBM Watson® Assistant provides a user interface for building conversation workspaces that define a conversation system. For example, the IBM Watson® Assistant may be used to build and scale automated dialog systems to provide customized virtual assistants. The IBM Watson® Assistant provides interfaces permitting a user to create intents and entities, build dialogs, and test automated dialog systems.

The initial steps during execution of an automated dialog system may be to classify user input into one of the intents specified in an associated conversation workspace, and to detect entities. In order to increase robustness of the automated dialog system, it is desired to automatically generate test cases for which the intent classifier and/or entity detection fail, to obtain human-interpretable explanations for such test cases, and to perform retraining of the automated dialog system in order to improve the classifier.

It should be noted that test cases or adversarial input is not limited solely to test cases in which intent is incorrectly mapped. For example, the input of "play some melodies" may correctly map to the "turn_on" intent, but may fail to recognize "melodies" as belonging to the entity of "appliances" with value of "music." Accordingly, the entire input is mapped to an intent rather than a specific part of the input. Also, entity detection in the input can be carried out in parallel for the entire input, wherein specific portions of the input are matched to certain entities if possible.

The presence of test cases or adversarial input that misleads a virtual assistant or automated dialog system leads to various vulnerabilities, and can erode trust of users in the automated dialog system.

Conventional techniques for adversarial sample or test case generation have a number of drawbacks. For example, some conventional techniques are only useful for generating samples with spelling or grammatical mistakes that are easily caught using spelling and grammar check tools. Even conventional techniques which go beyond merely generating samples with spelling and grammatical mistakes do not address the issue of generating test cases for conversation systems directly, considering aspects specific to a particular conversation workspace such as entity detection. Further, conventional techniques fail to provide human-interpretable explanations for a user or operator of the automated dialog system thus allowing the user to make informed decisions while selecting samples for hardening the automated dialog system.

Illustrative embodiments provide systems and methods, which overcome these and other drawbacks of conventional techniques. In some embodiments, automated dialog hardening systems are configured to automatically generate test cases for which a given conversation workspace of an automated dialog system fails. Automated dialog hardening systems in some embodiments are further configured to generate interpretable explanations corresponding to such test cases, and to perform hardening of the automated dialog system against such test cases.

The automated dialog hardening system may take as input a conversation workspace of an automated dialog system and an at least partially trained automated dialog system for testing adversarial input. As output, the automated dialog hardening system provides a set of test cases or samples that mislead the trained automated dialog system, along with interpretable explanations for such test cases. The output may further include a "hardened" or retrained automated dialog system that accounts for the test cases that mislead the trained automated dialog system.

To begin, an automated dialog hardening system may find a term frequency-inverse document frequency (tf-idf) representation of each intent in a conversation workspace. Various models may be used to find the tf-idf representations, including Word2vec, Global Vectors for Word Representation (GloVe), etc. A vector representation of each intent is then generated, such as by averaging over vector representations of each example of that intent. Similarity scores are then computed for different pairs of intents, and the pairs of intents are ranked by the similarity scores. In some embodiments, cosine similarity is used to compute the similarity scores for each intent pair.

Using the ranked similarity scores, a pair of intents is then chosen (e.g., a "closest" pair or pair of intents with the highest similarity score). For each example intent of the selected pair, the system will utilize Local Interpretable Model-Agnostic Explanations (LIME) to find human-interpretable explanations and add features determined to be important to the explanation set for the corresponding intent pair along with a weight value.

LIME is a tool for providing human-interpretable explanations for a model (e.g., a machine learning or other type of "black box" model). LIME is useful for providing an ability to explain what a particular model is doing, such as by providing links between features of an input that explain why a particular output is achieved. In the context of conversation workspaces, this may involve identifying which word(s) or phrase(s) in an example input result in classification to particular intents or nodes thereof in the conversation workspace. By comparing the LIME results for example input and generated test cases, a user or client is able to determine why misclassification occurred, without requiring a deep understanding of how the underlying machine learning or other black box model works.

After word sense disambiguation, synonym replacement is performed for the words determined to be important to the corresponding intents. The automated dialog system is then queried using such replacements to check for test cases that lead to misclassification for the intents. Paraphrase generation techniques, such as back-translation from different anchor languages, may also be utilized to generate variations of the input example and query the automated dialog system to check for test cases that lead to misclassification for the intents. Synonym-based replacement may also be performed for the entity values present in the example, to check for the possibility of test cases that lead to intent misclassification, entity mismatch, or dialog node mismatch.

A language model is then utilized to find probabilities for the generated test cases. LIME is used to obtain explanations of the generated test cases. The system returns the set of test samples, along with their probabilities and explanations. This explanation set for the selected pair of intents may be provided to a user for analysis. The user can then choose which samples to inject into the conversation workspace interactively. These inputs may be used for hardening the automated dialog system to avoid possible misclassification (e.g., of intents, of entities, etc.).

To find pairwise intent similarities by obtaining a tf-idf based vector representation for each intent, the following processing may be used in some embodiments. Suppose a conversation workspace has N intents, and $n_i$ examples corresponding to the ith intent. A set adv_set={ } is initialized. Next, a tf-idf based vector representation for each example of each intent is found. Suppose that the jth example of the ith intent is given by the sequence of words $<w_1, w_2, \ldots, w_k>$. The vector representation is thus given by:

$$e_j^{(i)} = \sum_{k=1}^{K} \text{tf\_idf}(w_k) * vec(w_k)$$

wherein tf_idf(w) denotes the tf_idf score of the word w and vec(w) represents the Word2vec/GloVe representation of w.

The mean of the vector representation of the examples of an intent is computed to get a vector representation of the intent:

$$v_i = \frac{1}{n_i} \sum_{j=1}^{n_i} e_j^{(i)}.$$

Pairwise intent similarity is found by computing a similarity score (e.g., using cosine similarity) between the intent vectors for each intent pair:

$$sim(v_i, v_j) = \frac{v_i \cdot v_j}{\|v_i\| \|v_j\|}.$$

The list of intent pairs may then be sorted by decreasing similarity scores. The most similar intent pairs, which should correspond to the intent pairs most vulnerable to misclassification, are then selected to try to find test samples that mislead the automated dialog system.

From the sorted list, the closest intents are taken, and for each intent I, I_exp={ } is initialized. LIME is run on each example E of the intent I, to find the most important word responsible for classification, and add that word to I_exp:

($w_{imp}$,weight$_{imp}$)←LIME(E,I); I_exp I exp ∪ ($w_{imp}$, weight$_{imp}$).

Next, the sense of this word, denoted $\text{wsd}_{w_{imp}}$, is determined by word sense disambiguation. The word $w_{imp}$ is then replaced with synonyms (e.g., from WordNet) specific to the $\text{wsd}_{w_{imp}}$. A language model is then used to find the probability of the sentence generated by replacement: S=replace (E, syn ($w_{imp}$, $\text{wsd}_{w_{imp}}$)); p=LM(S), wherein Lm denotes the language model, which may be trained on a large corpus.

If the sentence has non-negligible probability (e.g., probability above some designated threshold), and if it is classified to a different intent, the sentence is added to the set of test cases to be returned to the designer of the conversation workspace, i.e., if p>>0 and WA$_{intent}$(S)≠I, then:

adv_set←adv_set∪ S.

Similarly, different paraphrase generation techniques and synonym-based replacement for entity values present in the example are used to check for test cases that result in misclassification. LIME is run on the generated test cases or samples to get an interpretable explanation corresponding to wrong intent to which they are classified:

exp=LIME(S,WA$_{intent}$(S)).

The generated sample S is then reported, along with the explanation ($w_{imp}$, exp) and the sample probability p. The system may suggest addition of examples to the workspace in the cases where the test samples have not been generated by the replacement of an entity value. The system may also suggest addition of synonyms to entity values where the test cases have been generated by replacement of an entity value.

In some embodiments, a budget is specified in terms of the time and computational resources to be spent on hardening a conversation workspace of an automated dialog system. The budget may be used to stop the search for test cases whenever the budget is exceeded. If no such budget is specified, there is no requirement of computing intent similarity, since the system can search for all examples in the conversation workspace. The intent similarity may still be computed even if no budget is specified, though as noted above it is not a requirement. When no budget is specified, an exhaustive search may be performed over all possible variations for each example.

In some embodiments, the system is configured to provide a user or client with an estimate of the time it might take in order to generate test cases by looking at the entire workspace (e.g., with no budget). This estimate may be generated by initially running the search operation on only a small number of examples. The estimate may be used by the client to specify a budget interactively. Further, in some embodiments the generated test cases may be provided to the client interactively, without waiting for the entire process to complete thus enabling the client to choose whether to discard any particular test case or sample, or whether to stop a search in progress. Based on feedback from the client on adv_set, examples and entity values may be added to the conversation workspace to harden the automated dialog system.

Figure 2:
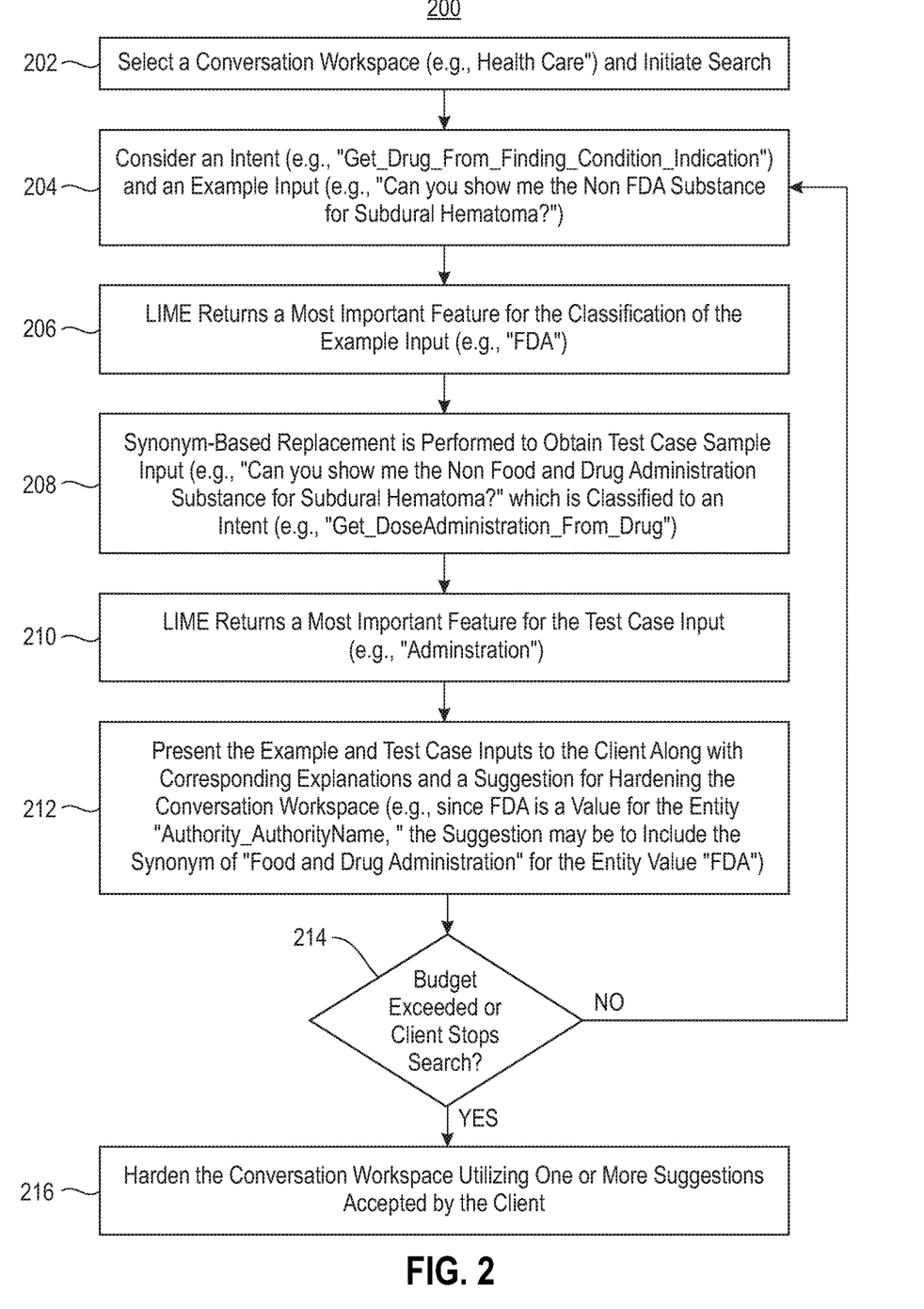
FIG. 2 depicts a processing flow for testing and hardening a workspace in an automated dialog system, according to an exemplary embodiment of the present invention.

FIG. 2 depicts a processing flow 200 for hardening a conversation workspace of an automated dialog system. The processing flow 200 begins with step 200, selecting a conversation workspace and initiating a search for test cases which result in misclassification in that conversation workspace. In the FIG. 2 example, is it assumed that a "Health Care" conversation workspace is selected in step 202, such as for a virtual assistant that assists users in answering questions related to health, medication and other issues.

In step 204, an intent in the selected conversation workspace is considered, along with an example input. Selection of the intent in step 204 may be based on a ranking of intents or pairs of intents by similarity score as described elsewhere herein. In the FIG. 2 example, it is assumed that a "Get_Drug_From_Finding_Condition_Indication" intent is selected, along with an example input of "Can you show me the non FDA substance for subdural hematoma?".

In step 206, LIME is run on the example input to identify the most important feature in classification of the example input. In the FIG. 2 example, the most important feature returned by LIME is "FDA."

In step 208, synonym-based replacement of the most important feature is performed so as to obtain test case sample inputs for determining possible misclassification. Synonym-based replacement may utilize any suitable library or dictionary, such as that available from WordNet®. In the FIG. 2 example, the test case sample input is "Can you show me the non Food and Drug Administration substance for subdural hematoma?" which is classified as the intent "Get_DoseAdministration_From_Drug."

To understand this misclassification, LIME is run on the test case sample input in step 210. In the FIG. 2 example, this results in LIME returning "Administration" as the most important feature for the test case sample input, which explains why the wrong intent was classified.

In step 212, the example input and test case input are presented to a client (e.g., a user or entity which initiated the search of the selected conversation workspace in step 202, or another designated user or entity). The explanations for classification of both the example and test case inputs are also provided to the client, along with a suggestion for hardening the conversation workspace to avoid that misclassification. In the FIG. 2 example, the suggestion may be to add the "Food and Drug Administration" synonym as a value for the entity to which "FDA" belongs (e.g., the entity "Authority_AuthorityName").

In step 214, it is determined whether a client-specified budget for performing the search of the selected conversation workspace has been exceeded, or whether the client has intervened to stop the search. If the result of the step 214 determination is no, the processing flow 200 returns to step 204 to analyze additional example inputs in the conversation workspace. If the result of the step 214 determination is yes, the processing flow 200 ends in step 216 with hardening the conversation workspace utilizing one or more suggestions (e.g., presented to the client in step 212) that are accepted by the client.

An automated dialog or conversation system may include both a procedural program and a text classifier. The procedural program is realized in the dialog flow, where each dialog state has an input condition, a slot condition, a response and a next state condition. The input condition may be a Boolean expression involving an intent and one or more entities. The slot condition may involve entities and context variables. The response and next state conditions may involve entities and context variables. Thus, test cases for conversation systems are not simple natural language inputs, but instead include an input comprising a context and natural language utterance, along with an output comprising a response, next state and context.

Generation of test cases for a conversation system requires an analysis of the procedural part as well as the classification part. To generate the context portion of the input, symbolic evaluation of the procedural part of the conversational code is required. To generate the natural language utterance, adversarial analysis along with string analysis (e.g., to ensure that entities are present, since an entity can be described using a regular expression of strings) is required.

Figure 3:
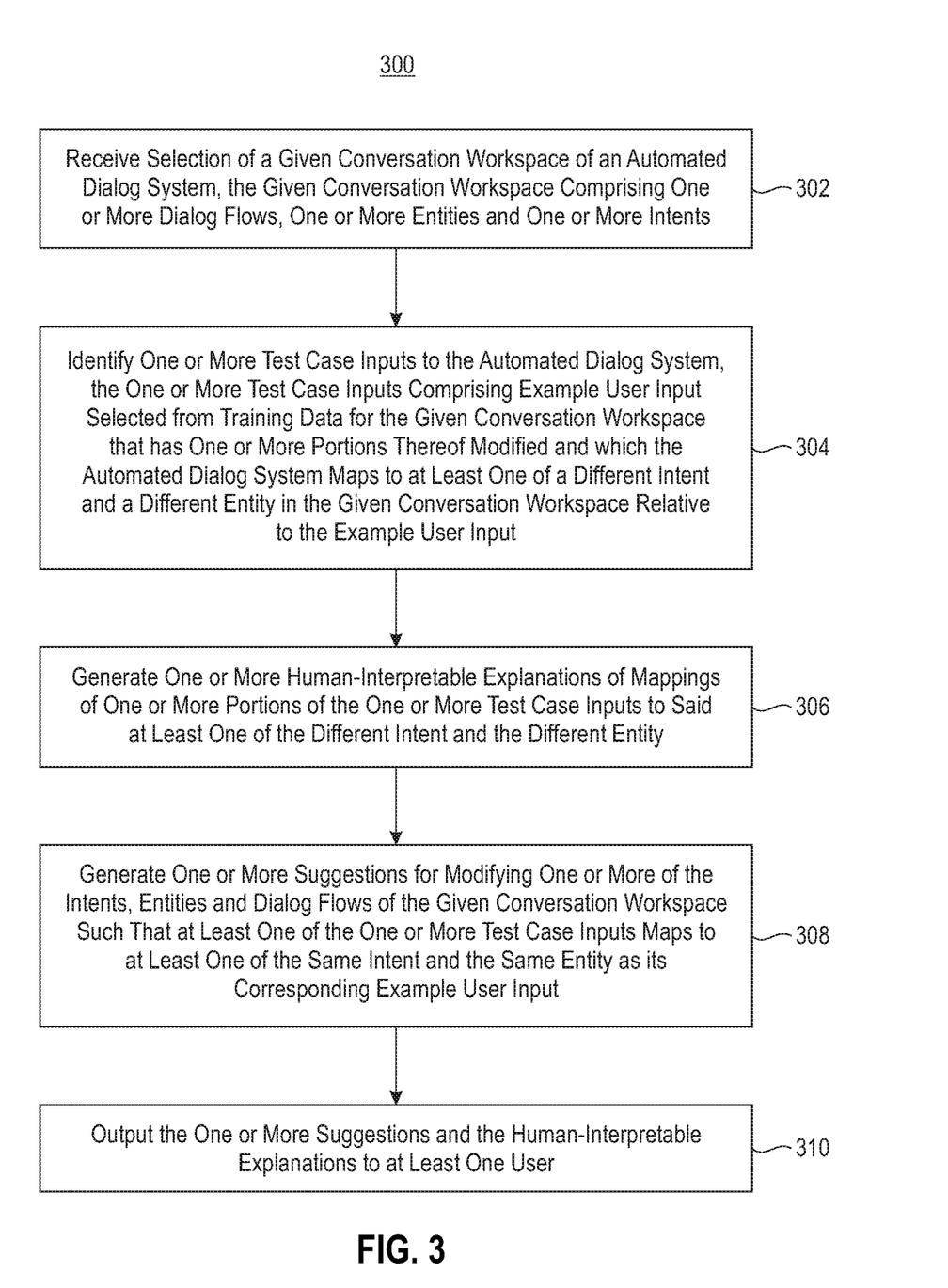
FIG. 3 depicts a process for automated testing of a dialog system, according to an exemplary embodiment of the present invention.

FIG. 3 depicts a process flow 300 for training an automated dialog system by hardening a conversation workspace thereof against adversarial input (e.g., test case inputs that result in misclassification). The process flow 300 begins with step 302, receiving selection of a given conversation workspace of the automated dialog system. The given conversation workspace is illustratively part of an at least partially trained automated dialog system (e.g., one which is trained on a set of training data or example user inputs, such as automated dialog system 101). The given conversation workspace includes one or more dialog flows, one or more entities and one or more intents.

In step 304, one or more test case inputs to the automated dialog system are identified. The one or more test case inputs comprise example user input selected from training data for the given conversation workspace that has one or more portions thereof modified, and which the automated dialog system maps to at least one of a different intent and a different entity in the given conversation workspace relative to the example user input. One or more human-interpretable explanations of mappings of one or more portions of the one or more test case inputs to the different intent and/or different entity are generated in step 306.

One or more suggestions for modifying one or more of the intents, entities and dialog flows of the given conversation workspace are generated in step 308. The suggestions generated in step 308 are suggestions which would ensure that at least one of the test case inputs maps to at least one of the same intent and the same entity as its corresponding example user input. The one or more suggestions, along with the human-interpretable explanations generated in step 306, are output to at least one user in step 310. The at least one user may be an operator or designer of the automated dialog system or the given conversation workspace. Utilizing the human-interpretable explanations, the at least one user can select which suggestions to implement for hardening the given conversation workspace against adversarial input (e.g., input which results in misclassification). The processing flow 300 may further include receiving, from the at least one user, selection of at least one of the one or more suggestions to implement for hardening the given conversation workspace and modifying the given conversation workspace in accordance with the selected at least one suggestion. The at least one suggestion may be to add at least one example user input for at least one of the intents, to add at least one synonym to the values for at least one of the entities, etc.

In some embodiments, step 304 includes receiving, from the at least one user, a computational budget for identifying the one or more test cases. In such cases, the search space of intents in the given conversation workspace should be prioritized, such that test case inputs may be identified within the specified budget. To do so, the system performing the processing flow 300 (e.g., automated dialog training system 102) may obtain a vector representation of each example user input of each intent in the given conversation workspace, compute a vector representation of each of the intents as a function of the vector representations of the example user inputs, determine similarity scores between pairs of the intents, and sort a list of the intent pairs based at least in part on the similarity scores. The vector representations may comprise tf-idf based vector representations. Computing the vector representation of a given one of the intents may comprise computing a mean of the vector representations of the example user inputs of the given intent. Determining the similarity scores may comprise computing a cosine similarity between the vector representations of each intent pair. The list of intent pairs may be sorted by decreasing similarity score.

Given the sorted list of intent pairs, the search space of the given conversation workspace may be prioritized in accordance with the specified budget. The system can then identify the one or more test case inputs by selecting a given one of the intents based at least in part on the sorted list of intent pairs (e.g., selecting a highest ranking intent that has not yet been searched for test case inputs). The system further identifies, for a given example user input of the given intent, at least one word determined to be responsible for classification of the given example user input as corresponding to at least one of the given intent and a given entity. A candidate test case input is generated by replacing the at least one word with one or more synonyms, and a probability of the candidate test case input is determined using a language model. Responsive to the candidate test case input having a probability above a designated threshold and responsive to the automated dialog system misclassifying the candidate test case input, the candidate test case input is added to the identified one or more test case inputs. Identifying the at least one word determined to be responsible for classification of the given example user input as corresponding to the given intent may comprise applying LIME to the given example user input. Generating the candidate test case input may comprise determining a part of speech of said at least one word and selecting a synonym of said at least one word having the same part of speech as said at least one word. The outputting in step 310 may include outputting probabilities associated with respective ones of the test cases determined utilizing the language model.

Figure 4:
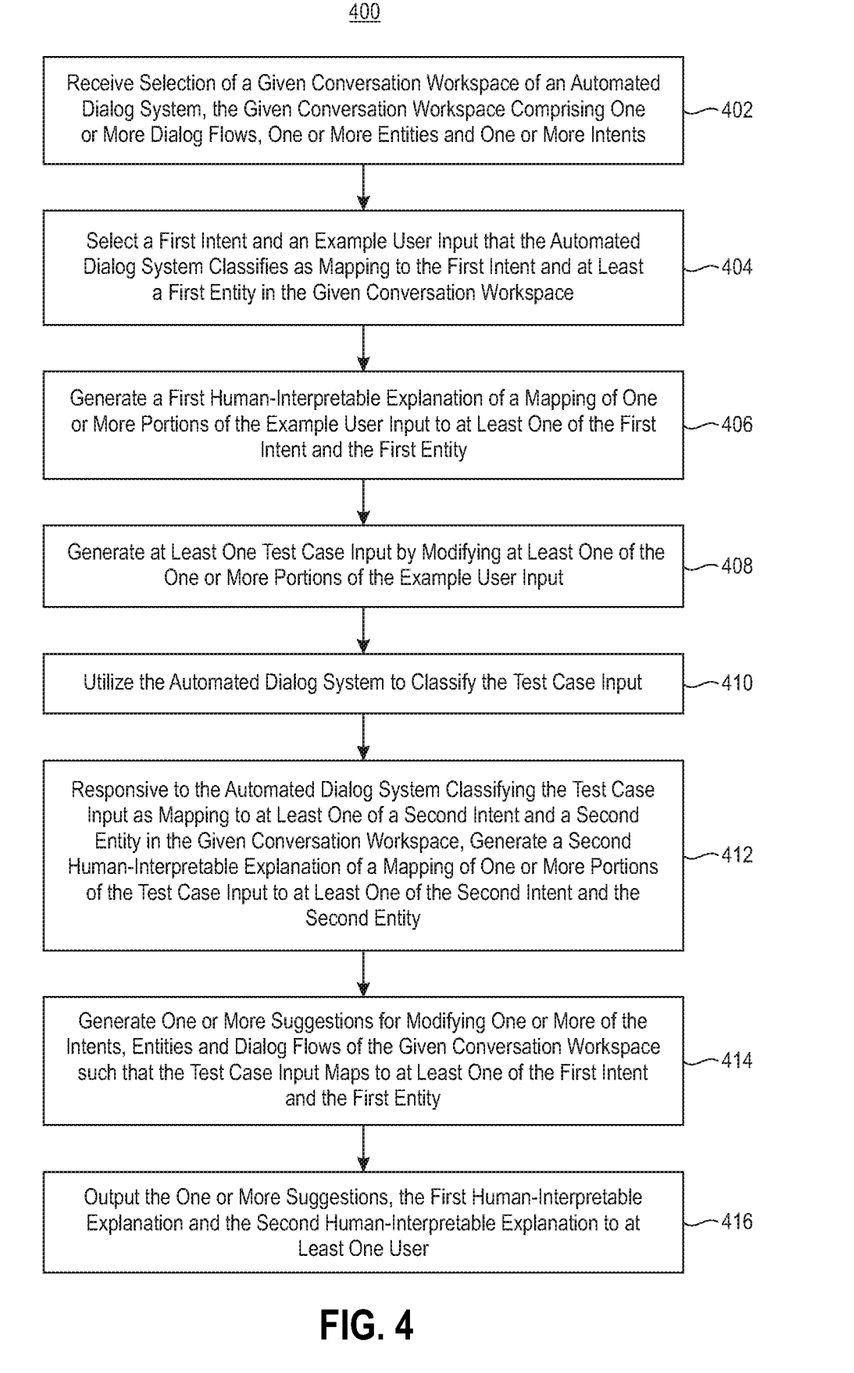
FIG. 4 depicts another process for automated testing of a dialog system, according to an exemplary embodiment of the present invention.

FIG. 4 depicts a process flow 400 for training an automated dialog system by hardening a conversation workspace thereof against adversarial input (e.g., test case inputs that result in misclassification). The process flow 400 begins with step 402, receiving selection of a given conversation workspace of the automated dialog system. The given conversation workspace is illustratively part of an at least partially trained automated dialog system (e.g., one which is trained on a set of training data or example user inputs such as automated dialog system 101). The given conversation workspace includes one or more dialog flows, one or more entities and one or more intents.

In step 404, a first intent of the given conversation workspace is selected, along with an example user input which the automated dialog system classifies as mapping to the selected first intent. The example user input may also map to at least a first entity in the given conversation workspace. A first human-interpretable explanation of a mapping of one or more portions of the example user input to at least one of the first intent and the first entity is generated in step 406. The one or more portions of the example user input may include specific words or phrases that are determined to be important or otherwise represent the reason for classification of the example user input as mapping to the first intent and/or first entity. Test case input is generated in step 408 by modifying at least one of the one or more portions of the example user input (e.g., by modifying a word, words or phrases that are determined to be important in classifying the example user input as the first intent and/or first entity). This modification may be performed by substituting words or phrases for synonyms determined using a defined dictionary.

The automated dialog system is used in step 410 to classify the test case input. If the test case input correctly maps to the first intent and/or first entity with the modifications, then no further action is needed. Responsive to the automated dialog system classifying the test case input as mapping to at least one of a second intent and a second entity in the given conversation workspace in step 410 (e.g., where the second intent and second entity are different than the first intent and first entity), a second human-interpretable explanation of a mapping of one or more portions of the test case input to at least one of the second intent and the second entity is generated in step 412. The second human-interpretable explanation, similar to the first human-interpretable explanation, may identify particular words or phrases in the test case input determined to be responsive for classifying the test case input or portions thereof as mapping to the second intent and/or second entity.

In step 414, one or more suggestions for modifying one or more of the intents, entities and dialog flows of the given conversation workspace are generated. The suggestions generated in step 414 are suggestions which would ensure that the test case input maps to at least one of the first intent and the first entity rather than the second intent and second entity (e.g., such that the test case user input is not misclassified). The suggestions generated in step 414 are output to at least one user in step 416, along with the first and second human-interpretable explanations. The at least one user, who may be a designer or operator of the automated dialog system or the given conversation workspace, can analyze the first and second human-interpretable explanations and determine whether to accept or reject the suggestions. The at least one user may provide input back to the system (e.g., an automated dialog training system 102 that performs the processing flow 400) to modify the given conversation workspace in accordance with the accepted at least one suggestion. The suggestions may include adding example user inputs to the first intent, adding synonyms to the values of the first entity, etc.

Illustrative embodiments provide a number of advantages relative to conventional techniques. For example, some embodiments permit testing of a conversation system before deployment (e.g., offline) through automatic generation of test cases based on the training data used for a particular conversation workspace. Conventional techniques that rely on live user input obtained after deployment do not permit hardening of a conversation workspace prior to deployment.

Some embodiments generate semantics-preserving transformation of existing training data, and do not require user involvement in the testing process. Further, involvement of the conversation workspace designer is optional and limited, and the testing and retraining of the conversation workspace can proceed without involvement of the conversation workspace designer. Illustrative embodiments further provide for explainability of misclassifications of generated test cases. Thus, when the conversation workspace designer is involved in selecting which suggestions to adopt for hardening the conversation workspace, the designer can make informed decisions using the human-interpretable explanations of the misclassifications that are provided.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
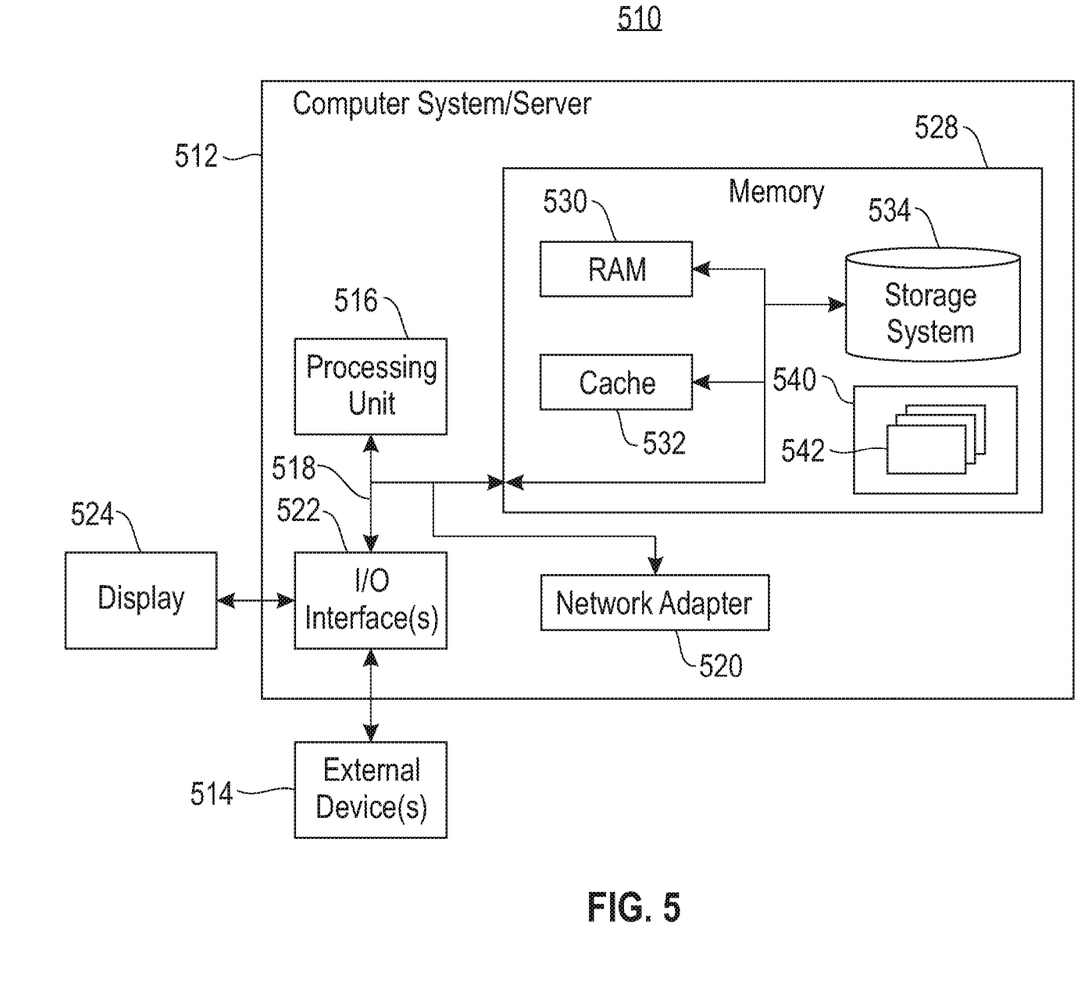
FIG. 5 depicts a computer system in accordance with which one or more components/steps of techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
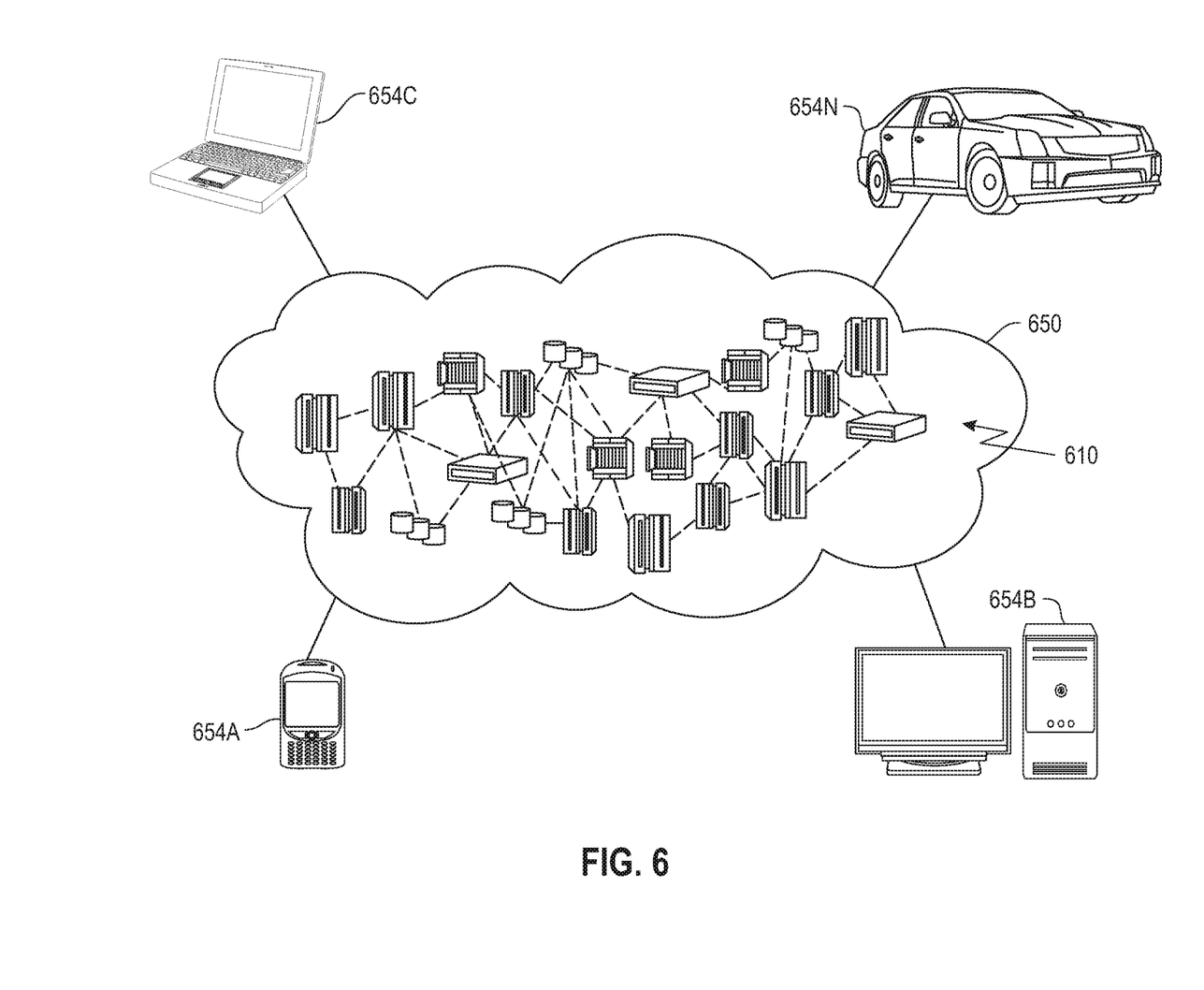
FIG. 6 depicts a cloud computing environment, according to an exemplary embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
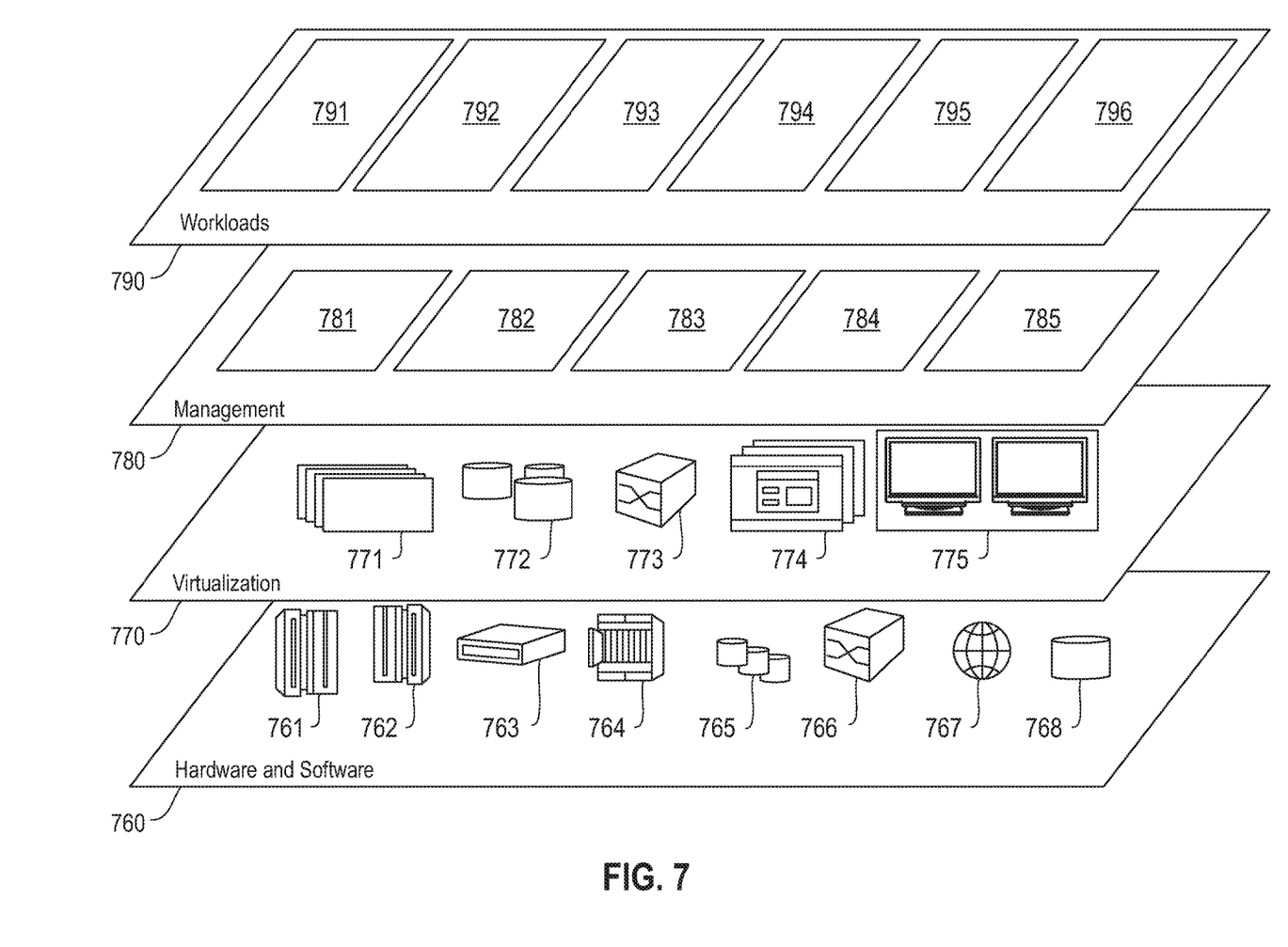
FIG. 7 depicts abstraction model layers, according to an exemplary embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 734; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and automated dialog system training processing 796, which may perform various functions described above with respect to resource demand prediction and forecasting techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a selection of a given conversation workspace of an automated dialog system, the given conversation workspace comprising (i) one or more dialog flows, (ii) one or more entities, and (iii) one or more intents;
    identifying one or more test case inputs to the automated dialog system, the one or more test case inputs comprising example user input selected from training data for the given conversation workspace, in which (i) the example user input has one or more portions thereof modified from an original form, and (ii) which the automated dialog system maps to at least one of (a) a different intent and (b) a different entity in the given conversation workspace, relative to the example user input, wherein said identifying comprises:
        receiving, from at least one user, a computational budget for identifying the one or more test cases;
        obtaining a vector representation of each example user input of each intent in the given conversation workspace;
        computing a vector representation of each of the intents as a function of the vector representations of the example user inputs;
        determining similarity scores between pairs of the intents; and
        sorting a list of the intent pairs based at least in part on the similarity scores;
    generating one or more human-interpretable explanations of mappings of one or more portions of the one or more test case inputs to said at least one of (i) the different intent and (ii) the different entity;
    generating one or more suggestions for modifying one or more of the (i) intents, (ii) entities and (iii) dialog flows of the given conversation workspace such that at least one of the one or more test case inputs maps to at least one of the same intent and the same entity as its corresponding example user input; and
    outputting (i) the one or more suggestions and (ii) the human-interpretable explanations to the at least one user;
    wherein the method is carried out by at least one processing device.

2. The computer-implemented method of claim 1, comprising:
    receiving, from the at least one user, a selection of at least one of the one or more suggestions to implement for hardening of the given conversation workspace; and
    modifying the given conversation workspace in accordance with the selected at least one suggestion.

3. The computer-implemented method of claim 1, wherein the vector representations comprise term frequency-inverse document frequency based vector representations.

4. The computer-implemented method of claim 1, wherein said computing the vector representation of a given one of the intents comprises computing a mean of the vector representations of the example user inputs of the given intent.

5. The computer-implemented method of claim 1, wherein said determining the similarity scores comprises computing a cosine similarity between the vector representations of each intent pair.

6. The computer-implemented method of claim 1, wherein the list of intent pairs is sorted by decreasing similarity score.

7. The computer-implemented method of claim 1, wherein said identifying the one or more test case inputs comprises:
    selecting a given one of the intents based at least in part on the sorted list of intent pairs;
    identifying, for a given example user input of the given intent, at least one word determined to be responsible for classification of the given example user input as corresponding to at least one of the given intent and a given entity;
    generating a candidate test case input by replacing the at least one word with one or more synonyms;
    determining, utilizing a language model, the probability of the candidate test case input being misclassified;
    responsive to the candidate test case input having a probability above a designated threshold and responsive to the automated dialog system misclassifying the candidate test case input, adding the candidate test case input to the identified one or more test case inputs.

8. The computer-implemented method of claim 7, wherein said identifying the at least one word determined to be responsible for classification of the given example user input as corresponding to the given intent comprises applying a Local Interpretable Model-Agnostic Explanations model to the given example user input.

9. The computer-implemented method of claim 7, wherein said generating the candidate test case input comprises:
    determining a word sense of said at least one word; and
    selecting a synonym of said at least one word having the same word sense as said at least one word.

10. The computer-implemented method of claim 7, wherein said outputting the one or more suggestions and the human-interpretable explanations to at least one user comprises outputting probabilities associated with respective ones of the test cases determined utilizing the language model.

11. The computer-implemented method of claim 1, wherein at least one of the one or more suggestions comprises a suggestion to add at least one example user input for at least one of the intents.

12. The computer-implemented method of claim 1, wherein at least one of the one or more suggestions comprises a suggestion to add at least one synonym to the values for at least one of the entities.

13. A computer program product, the computer program product comprising a non-transitory computer readable storage medium encoded with program instructions, the program instructions executable by at least one computing device to cause the at least one computing device to perform steps of:
receiving a selection of a given conversation workspace of an automated dialog system, the given conversation workspace comprising (i) one or more dialog flows, (ii) one or more entities, and (iii) one or more intents;
identifying one or more test case inputs to the automated dialog system, the one or more test case inputs comprising example user input selected from training data for the given conversation workspace, in which (i) the example user input has one or more portions thereof modified from an original form, and (ii) which the automated dialog system maps to at least one of (a) a different intent and (b) a different entity in the given conversation workspace, relative to the example user input, wherein said identifying comprises:
receiving, from at least one user, a computational budget for identifying the one or more test cases;
obtaining a vector representation of each example user input of each intent in the given conversation workspace;
computing a vector representation of each of the intents as a function of the vector representations of the example user inputs;
determining similarity scores between pairs of the intents; and
sorting a list of the intent pairs based at least in part on the similarity scores;
generating one or more human-interpretable explanations of mappings of one or more portions of the one or more test case inputs to said at least one of (i) the different intent and (ii) the different entity;
generating one or more suggestions for modifying one or more of the (i) intents, (ii) entities and (iii) dialog flows of the given conversation workspace such that at least one of the one or more test case inputs maps to at least one of the same intent and the same entity as its corresponding example user input; and
outputting (i) the one or more suggestions and (ii) the human-interpretable explanations to the at least one user.

14. The computer program product of claim 13, wherein the program instructions executable by at least one computing device cause the at least one computing device to perform steps of:
receiving, from the at least one user, a selection of at least one of the one or more suggestions to implement for hardening of the given conversation workspace; and
modifying the given conversation workspace in accordance with the selected at least one suggestion.

15. A system comprising:
a memory; and
at least one processor coupled to the memory and configured for:
receiving a selection of a given conversation workspace of an automated dialog system, the given conversation workspace comprising (i) one or more dialog flows, (ii) one or more entities, and (iii) one or more intents;
identifying one or more test case inputs to the automated dialog system, the one or more test case inputs comprising example user input selected from training data for the given conversation workspace, in which (i) the example user input has one or more portions thereof modified from an original form, and (ii) which the automated dialog system maps to at least one of (a) a different intent and (b) a different entity in the given conversation workspace, relative to the example user input, wherein said identifying comprises:
receiving, from at least one user, a computational budget for identifying the one or more test cases;
obtaining a vector representation of each example user input of each intent in the given conversation workspace;
computing a vector representation of each of the intents as a function of the vector representations of the example user inputs;
determining similarity scores between pairs of the intents; and
sorting a list of the intent pairs based at least in part on the similarity scores;
generating one or more human-interpretable explanations of mappings of one or more portions of the one or more test case inputs to said at least one of (i) the different intent and (ii) the different entity;
generating one or more suggestions for modifying one or more of the (i) intents, (ii) entities and (iii) dialog flows of the given conversation workspace such that at least one of the one or more test case inputs maps to at least one of the same intent and the same entity as its corresponding example user input; and
outputting the (i) one or more suggestions and (ii) the human-interpretable explanations to the at least one user.

16. The system of claim 15, wherein the at least one processor is configured for:
receiving, from the at least one user, a selection of at least one of the one or more suggestions to implement for hardening of the given conversation workspace; and
modifying the given conversation workspace in accordance with the selected at least one suggestion.

* * * * *